(12) United States Patent
Geelen et al.

(10) Patent No.: US 8,135,538 B2
(45) Date of Patent: Mar. 13, 2012

(54) NAVIGATION SYSTEM

(75) Inventors: Pieter Geelen, Amsterdam (NL);
Harold Goddijn, Amsterdam (NL);
Alexander Ribbink, Amsterdam (NL)

(73) Assignee: TomTom International B.V., Amsterdam (NL)

( * ) Notice: Subject to any disclaimer, the term of this patent is extended or adjusted under 35 U.S.C. 154(b) by 843 days.

(21) Appl. No.: 11/907,248

(22) Filed: Oct. 10, 2007

(65) Prior Publication Data

US 2008/0189033 A1    Aug. 7, 2008

Related U.S. Application Data

(60) Provisional application No. 60/879,523, filed on Jan. 10, 2007, provisional application No. 60/879,549, filed on Jan. 10, 2007, provisional application No. 60/879,553, filed on Jan. 10, 2007, provisional application No. 60/879,577, filed on Jan. 10, 2007, provisional application No. 60/879,599, filed on Jan. 10, 2007, provisional application No. 60/879,529, filed on Jan. 10, 2007, provisional application No. 60/879,601, filed on Jan. 10, 2007.

(51) Int. Cl.
*G01C 21/30* (2006.01)
*G06F 19/00* (2011.01)
*G06C 21/00* (2006.01)

(52) U.S. Cl. ......... 701/209; 701/123; 701/201; 701/207

(58) Field of Classification Search .................. 701/201, 701/207, 123, 209
See application file for complete search history.

(56) References Cited

U.S. PATENT DOCUMENTS

| | | | | |
|---|---|---|---|---|
| 4,564,905 A * | 1/1986 | Masuda et al. | ............... | 701/1 |
| 5,205,161 A * | 4/1993 | Erwin | ............... | 73/114.52 |
| 5,742,922 A * | 4/1998 | Kim | ............... | 701/201 |
| 5,878,368 A * | 3/1999 | DeGraaf | ............... | 701/209 |
| 5,913,917 A * | 6/1999 | Murphy | ............... | 701/123 |
| 6,005,494 A * | 12/1999 | Schramm | ............... | 340/995.19 |
| 6,092,021 A * | 7/2000 | Ehlbeck et al. | ............... | 701/123 |
| 6,467,337 B2 * | 10/2002 | Sadahiro et al. | ............... | 73/114.54 |
| 6,591,185 B1 * | 7/2003 | Polidi et al. | ............... | 701/201 |
| 2002/0059190 A1 | 5/2002 | Ishizaki | | |
| 2003/0191578 A1 * | 10/2003 | Paulauskas et al. | ............... | 701/200 |
| 2005/0055157 A1 * | 3/2005 | Scholl | ............... | 701/207 |
| 2005/0096836 A1 * | 5/2005 | Minami et al. | ............... | 701/123 |
| 2006/0278449 A1 * | 12/2006 | Torre-Bueno | ............... | 180/65.2 |
| 2007/0005237 A1 * | 1/2007 | Needham et al. | ............... | 701/202 |

FOREIGN PATENT DOCUMENTS

JP   2005 172582   6/2005

OTHER PUBLICATIONS

International Search Report issued on Jan. 24, 2008 for International Application No. PCT/EP2007/008728.
XP002463587—ALK Techonologies: "CoPilot Live 6 Pocket PC User Manual" Web Publication, Mar. 14, 2006 http://www.alk.com/support/copilotlive_pocketpc6/user_manual.pdf.

* cited by examiner

*Primary Examiner* — Khoi Tran
*Assistant Examiner* — Ian Jen

(57) ABSTRACT

A portable navigation device is set out for calculating fuel related parameters and returning related data to the user of the device. The related data may include fuel cost of a particular calculated route. Additional data may include particular displays of information including a theoretical calculated volumetric amount of fuel used by a vehicle in traveling along a calculated route before, during or after completion of travel. Other displayed data includes a theoretical calculated financial cost of fuel used by the vehicle in traveling along the calculated route before, during or after completion of travel. Still further displayed data may include an optimal calculated route chosen from many possible calculated routes, the optimization occurring on account of the relative fuel cost of each of the calculated routes.

7 Claims, 6 Drawing Sheets

NAVIGATION SYSTEM

CROSS REFERENCE TO RELATED APPLICATIONS

The present application hereby claims priority under 35 U.S.C. §119(e) on each of U.S. Provisional Patent Application Nos. 60/879,523 filed Jan. 10, 2007, 60/879,549 filed Jan. 10, 2007, 60/879,553 filed Jan. 10, 2007, 60/879,577 filed Jan. 10, 2007, 60/879,599 filed Jan. 10, 2007, 60/879,529 filed Jan. 10, 2007, 60/879,601 filed Jan. 10, 2007, the entire contents of each of which is hereby incorporated herein by reference. The content of the aforementioned are herein incorporated by reference.

BACKGROUND OF THE INVENTION

This invention relates to an improved navigation system, such system including processing means, a graphical display, memory, map data stored in said memory, and signal reception means for receiving one or more wireless signals by means of which the processor can determine a present location of the system. Specifically, this invention is concerned with an improved portable navigation device including all these features and operating under the control of software locally installed thereon.

Navigation systems, both portable and integrated, are well known, and becoming increasingly globally widespread. In particular, the adoption of portable navigation devices (PNDs) has been particularly rapid and in most developed countries, such devices are becoming ubiquitous, and most commonly being used in fuel-powered vehicles such as automobiles and motorbikes.

U.S. Pat. No. 5,742,922 describes an integrated vehicle navigation system and method of selecting a route for vehicle travel according to fuel consumption, such system being one which is installed in a vehicle at the time of manufacture, and is therefore not portable. The system includes an input device for selecting a destination, an antenna for receiving satellite signals and/or signals related to traffic situation, a memory, and a controller, such as a microcomputer, for determining a current vehicle position and alternative routes from the current vehicle position to the destination and for selecting from the alternative routes, according to altitude information for the routes and the traffic situation, a preferred route requiring the least fuel consumption. The method includes the steps of determining the current vehicle position based on signals received from satellites, determining the routes from the current position to the destination, and selecting from the routes the preferred route requiring the least amount of fuel consumption based on fuel consumption data entered into the system and related to the altitude differences over particular determined routes.

U.S. Pat. No. 6,591,185 describes a method for determining optimal fuel usage in a vehicle navigation system and a warning system for alerting a driver when there is insufficient fuel to reach a desired destination. In addition, there is disclosure of the making of a provision to calculate fuel usage and to alert the driver when there is insufficient fuel to reach a fuel filling station on a return trip from the desired destination. Specifically, the patent claims a method for determining fuel usage for a vehicle in a vehicle navigation system comprising the steps of entering a destination in the vehicle navigation system; calculating a first route to reach the destination; identifying a fuel filling station closest to the destination; calculating approximate fuel usage required for the vehicle to reach the destination by the first route plus fuel usage to reach the fuel filling station closest to the destination after reaching the destination; comparing the calculated fuel usage required for the vehicle to reach the destination by the first route plus fuel usage to reach the fuel filling station closest to the destination after reaching the destination with a quantity of fuel remaining in the vehicle; and displaying a message that the destination and the fuel filling station closest to the destination cannot be reached when the fuel remaining is less than said calculated fuel usage required for the vehicle to reach the destination by the first route plus fuel usage to reach the fuel filling station closest to the destination after reaching the destination.

The above patents relate to integrated navigation systems, and are not concerned with portable navigation devices (PNDs). PNDs are fundamentally different in that they are not typically integrated into the vehicle and in general are not in communication with the subsystems of the vehicle, nor can they typically derive any information therefrom, but function more as stand alone devices, albeit provided with certain information provided by the user at start-up and during conventional use. More recently, PNDs have begun to receive different types of wireless signal which not only provide information by means of which the present global position of the device can be determined, but also provide an indication of traffic congestion along a particular route. By means of such information it is possible for the device to perform a route recalculation to offer the driver of a vehicle alternatives which both avoid the congested section of the route and thus potentially reduce the time in which the driver will reach his desired destination, and/or render the driving experience less stressful by reducing frustration arising from being stationary for any length of time, and thus making the travel along a particular route more continuous.

For example, U.S. Pat. No. 6,711,498 describes a method for operating a navigation system for a vehicle, particularly for a motor vehicle, in which a travel route is calculated in a computing circuit on the basis of a location of the vehicle, a digitally stored map and a destination location, and is made available to the vehicle driver as an acoustical and/or visual message, where traffic information relevant to the travel route may be acquired via a receiver unit and a new travel time t resulting therefrom is calculated for the existing travel route with the aid of a predefined weighting factor Gf for a disturbance event and the length of a traffic disturbance Ls, and a travel time ta is calculated in the same manner for an alternative route, and in the event that the travel time ta of the alternative route is shorter than the travel time t of the travel route, is indicated to the vehicle driver. A correction value K for the weighting factors Gf is ascertained on the basis of the length of the traffic disturbance Ls, and a corrected weighting factor Gk is ascertained as a function of the correction value Kw and is used for calculating the new travel time t.

SUMMARY OF THE INVENTION

An object of the present invention is to provide an enhanced route calculation and recalculation function in a PND, and the provision for enhancing the information provided thereby regarding route calculation, which encompasses information related to the performance of the vehicle in which the device is provided.

BRIEF SUMMARY OF THE INVENTION

According to the present invention, there is provided a PND comprising processing means, a graphical display, memory, map data stored in said memory, user-input means, and signal reception means for receiving one or more wireless signals by means of which the processor can determine a present location of the system and in conjunction with user input desired destination information, perform route calculation and subsequent navigation functions, said location determination, route calculation and navigation functions being performed by software installed on the device, and
Characterized in that
Said memory also contains one or more fuel-use dependent parameters, said route calculation function utilizing said one or more parameters to return data representative of a fuel cost of a particular calculated route, said PND causing display of said data in terms of one of A theoretical calculated volumetric amount of fuel used by said vehicle in traveling along the calculated route before, during or after completion of travel along said route, A theoretical calculated financial cost of fuel used by said vehicle in traveling along the calculated route before, during or after completion of travel along said route, An optimal calculated route chosen from a plurality of possible calculated routes, the optimization occurring on account of the relative fuel cost of each of the calculated routes.

Preferably, the one or more fuel-use parameters are input by the device user, preferably at the time of start up of the device, and preferably the data entered is in the form of actual fuel volume and/or cost, most preferably immediately after a time when a user fills the vehicle with fuel.

In an alternative or additional embodiment, the one or more fuel-use parameters used in route calculation and recalculation are derived from the user input information, which may actual fuel volume data and cost data related thereto, or one or more averages of fuel consumption for particular geographic regions, roads or localities, or any combinations of these types of data may be entered. For example, the user-entered information may be any of the average inner-city fuel consumption, average motorway driving fuel consumption (adjusted as necessary for potential or actual traffic congestion), fuel consumption for non-motorway country driving, the cost of fuel per litre and the actual volume of the petrol tank or amount of petrol added to that tank during an immediately previous refilling operation and the like.

Fundamentally however, the PND requires only sufficient information to derive, calculate, or be indicative of a "relative" fuel cost such that some differentiation of the various routes calculated in terms of such fuel cost can be achieved.

In a most preferred embodiment, the PND is capable of updating the one or more fuel-use dependent parameters stored in memory by maintaining an average of the fuel consumption and cost over time as the user successively enters fuel volume and cost information, such averages encompassing one or more of the sum of the distance of traveled routes and the time taken to travel said routes, between each user data entry.

In a further preferred embodiment, the device prompts the user for fuel-related data entry at a time when the device has been stationery for a predetermined time in the vicinity of a fuel station point of interest (POI) stored within said map data.

In a preferred embodiment, the PND is capable of receiving wirelessly transmitted data including information regarding current fuel prices in one or more countries and of one or more fuel providers.

Accordingly, the functionality of the PND can be enhanced to provide the user with an indication of the most fuel-efficient route, as well as an indication of other types of optimized routes, such as the quickest, shortest, most continuous and most traffic-free, for example. Additionally, the PND can provide information to the user of the likely cost of a journey, both in financial and volumetric terms, the latter of course enabling the facility for advising a driver that he does not currently have sufficient fuel to travel to the destination entered into the PND and on which route calculation is based. In such a case, the PND may additionally highlight the location of one or more petrol stations along the proposed/calculated route, such being ideally located along said route before the location along said route at which the fuel volume known to the PND is estimated thereby to expire.

BRIEF DESCRIPTION OF THE DRAWINGS

The present application will be described in more detail below by using example embodiments, which will be explained with the aid of the drawings, in which.

DETAILED DESCRIPTION OF THE EXAMPLE EMBODIMENTS

Figure 1:
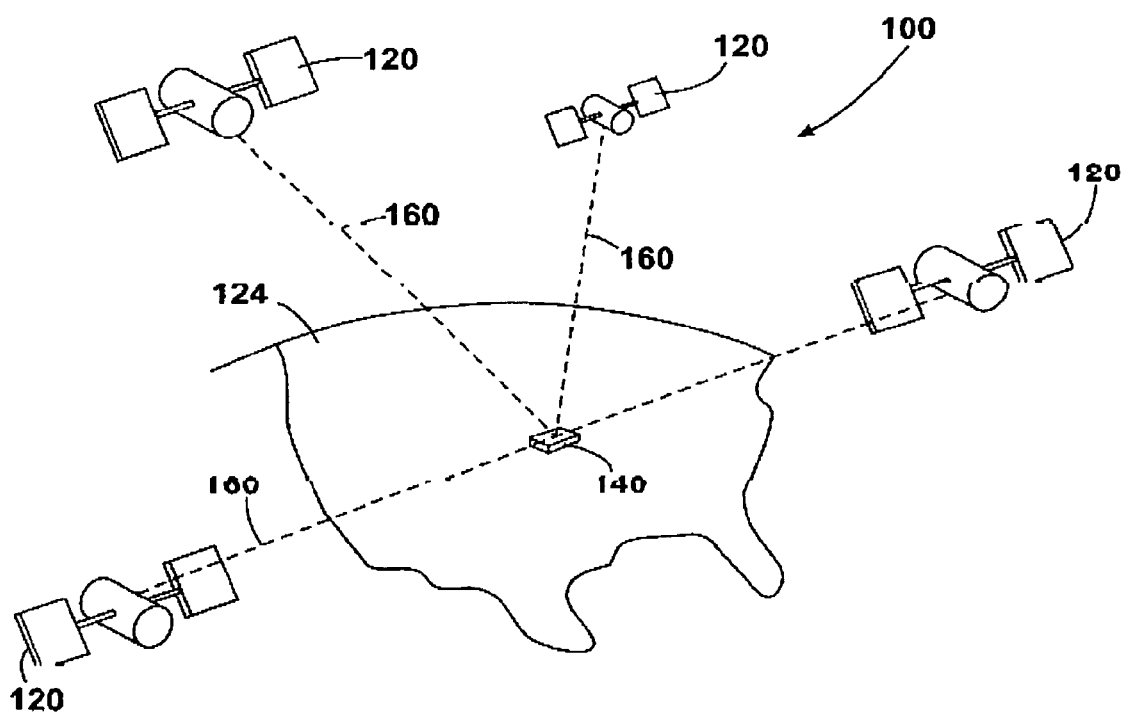
FIG. 1 illustrates an example view of a Global Positioning System (GPS)

FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users.

Formerly known as NAVSTAR, the GPS incorporates a plurality of satellites which work with the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

Figure 2:
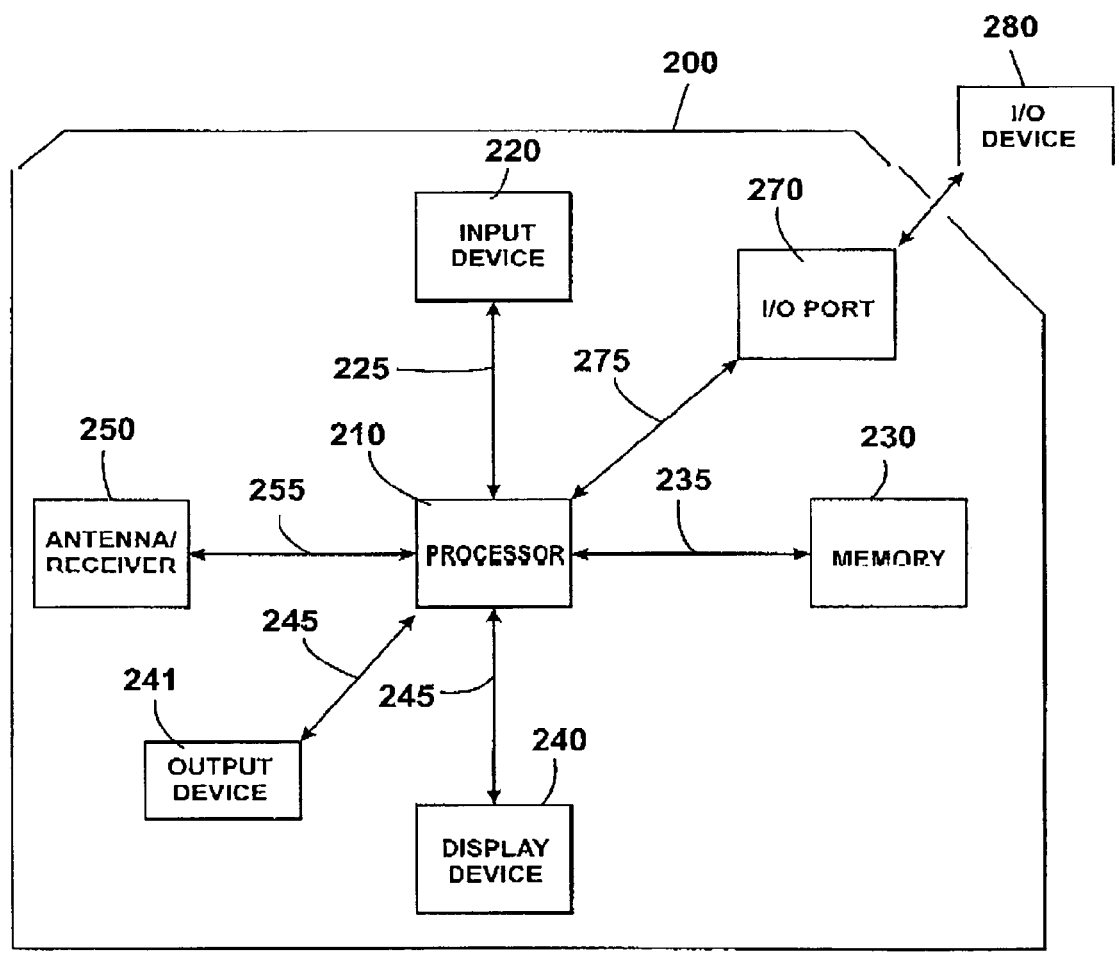
FIG. 2 illustrates an example block diagram of electronic components of a navigation device.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner. FIG. 2 illustrates an example block diagram of electronic components of a navigation device 200, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilized to input information; and the display screen 240 can include any type of display screen such as an LCD display, for example. The input device 220 and display screen 240 are integrated into an integrated input and display device, including a touchpad or touchscreen input wherein a user need only touch a portion of the display screen 240 to select one of a plurality of display choices or to activate one of a plurality of virtual buttons.

In addition, other types of output devices 250 can also include, including but not limited to, an audible output device. As output device 241 can produce audible information to a user of the navigation device 200, it is equally understood that input device 240 can also include a microphone and software for receiving input voice commands as well. In the navigation device 200, processor 210 is operatively connected to and set to receive input information from input device 240 via a connection 225, and operatively connected to at least one of display screen 240 and output device 241, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectable to an I/O device 280 external to the navigation device 200. The external I/O device 270 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

The navigation device 200 may establish a "mobile" or telecommunications network connection with the server 302 via a mobile device 400 (such as a mobile phone, PDA, and/or any device with mobile phone technology) establishing a digital connection (such as a digital connection via known Bluetooth technology for example). Thereafter, through its network service provider, the mobile device 400 can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device 400 (via a service provider) and another device such as the server 302, using the internet 410 for example, can be done in a known manner. This can include use of TCP/IP layered protocol for example. The mobile device 400 can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet.

The navigation device 200 can further complete a data connection with the mobile device 400, and eventually with the internet 410 and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet 410 for example, in a manner similar to that of any mobile device 400.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a motorized vehicle such as a car or boat for example. Such a navigation device 200 is then removable from the docked location for portable or handheld navigation use.

Figure 3:
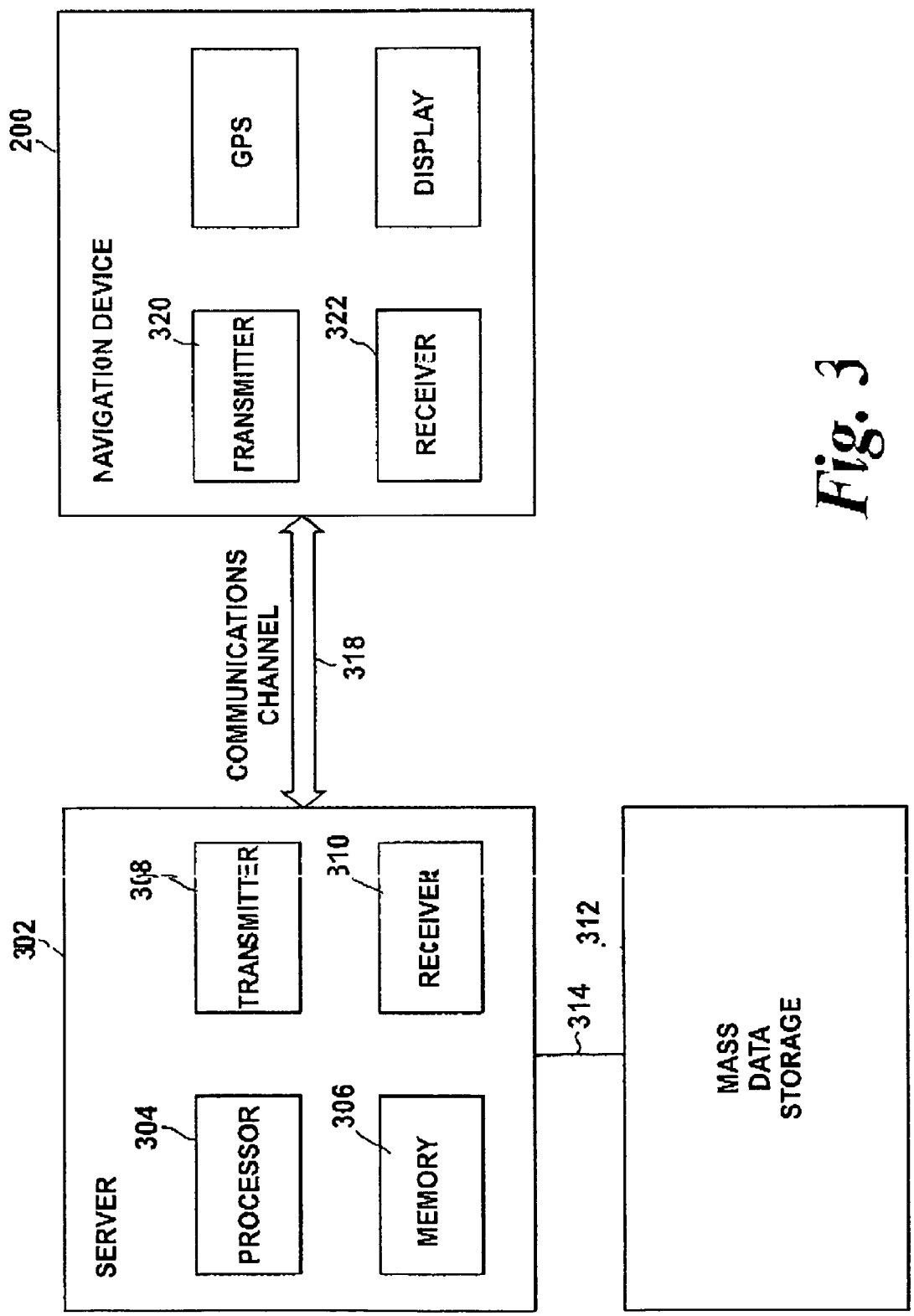
FIG. 3 illustrates an example block diagram of the manner in which a navigation device may receive information over a wireless communication channel.

FIG. 3 illustrates an example block diagram of a server 302 and a navigation device 200 capable of communicating via a generic communications channel 318. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver. Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, the communication channel 318 can include intermediate devices such as routers, repeaters, buffers, transmitters, and receivers, for example.

For example, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
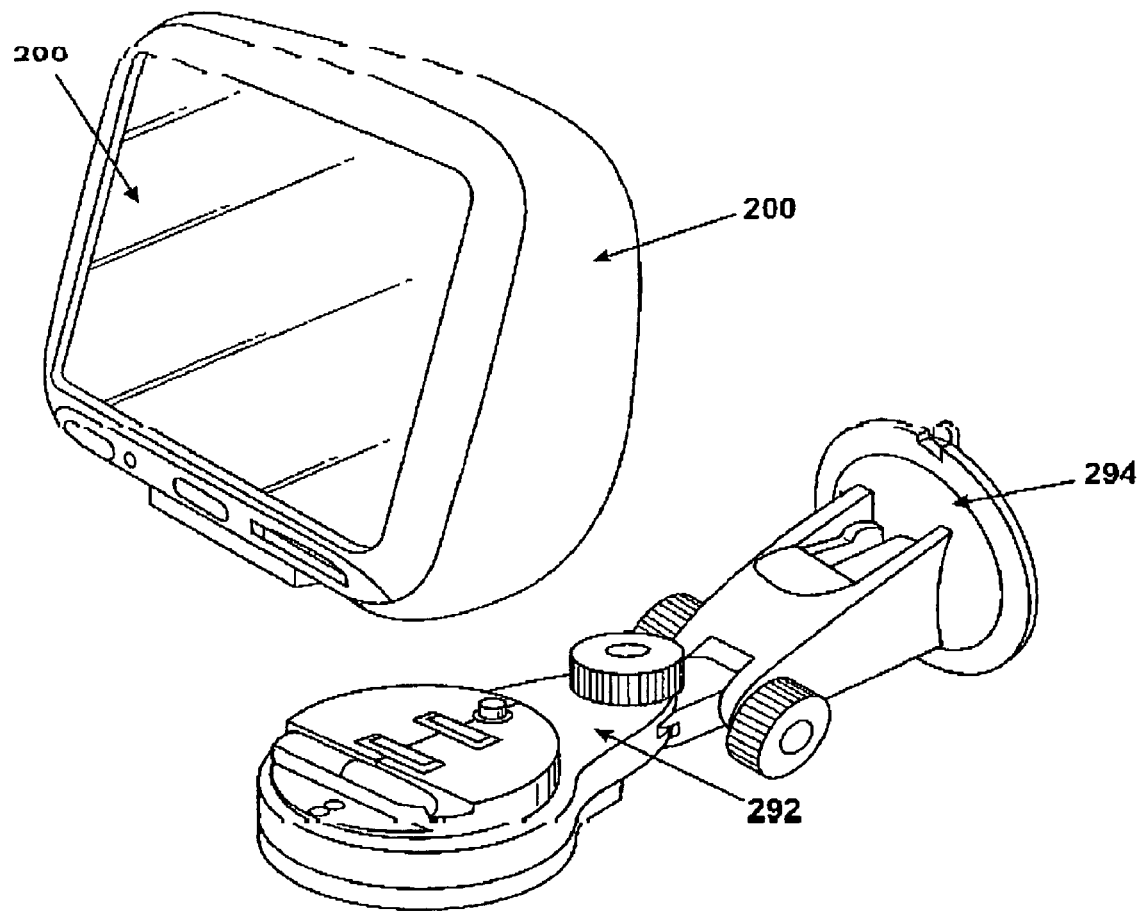
FIGS. 4A and 4B are perspective views of an implementation of an embodiment of the navigation device.
Figure 4B:
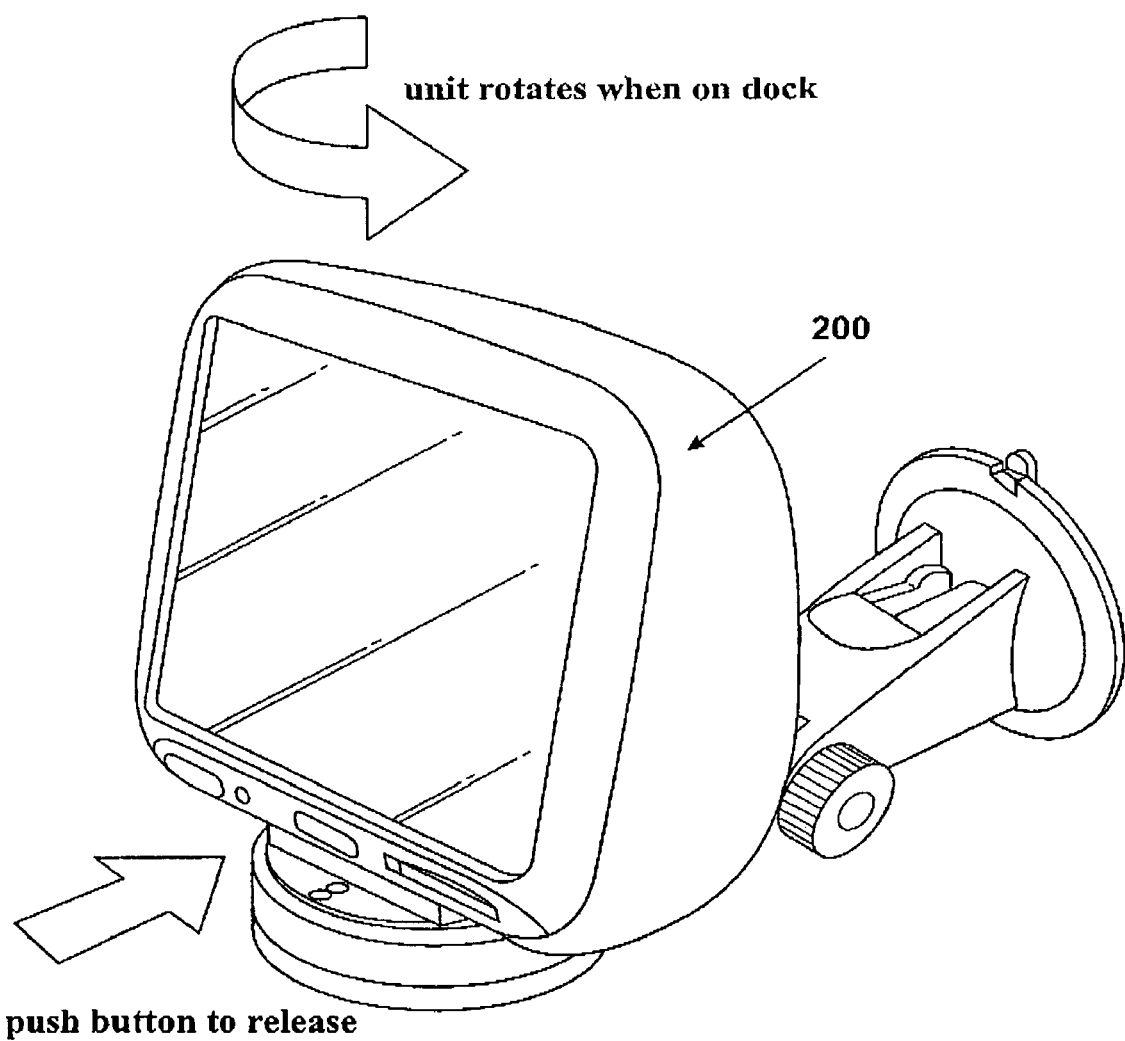

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 220, etc.).

The navigation device 200 may sit on an arm 292, which itself may be secured to a vehicle dashboard/window/etc. using a large suction cup 294. This arm 292 is one example of a docking station to which the navigation device 200 can be docked. As shown in FIG. 4B, the navigation device 200 can be docked or otherwise connected to an arm 292 of the docking station by snap connecting the navigation device 292 to the arm 292 for example (this is only one example, as other known alternatives for connection to a docking station are within the scope of the present application). The navigation device 200 may then be rotatable on the arm 292, as shown by the arrow of FIG. 4B. To release the connection between the navigation device 200 and the docking station, a button on the navigation device 200 may be pressed, for example (this is only one example, as other known alternatives for disconnection to a docking station are within the scope of the present application).

Figure 5:
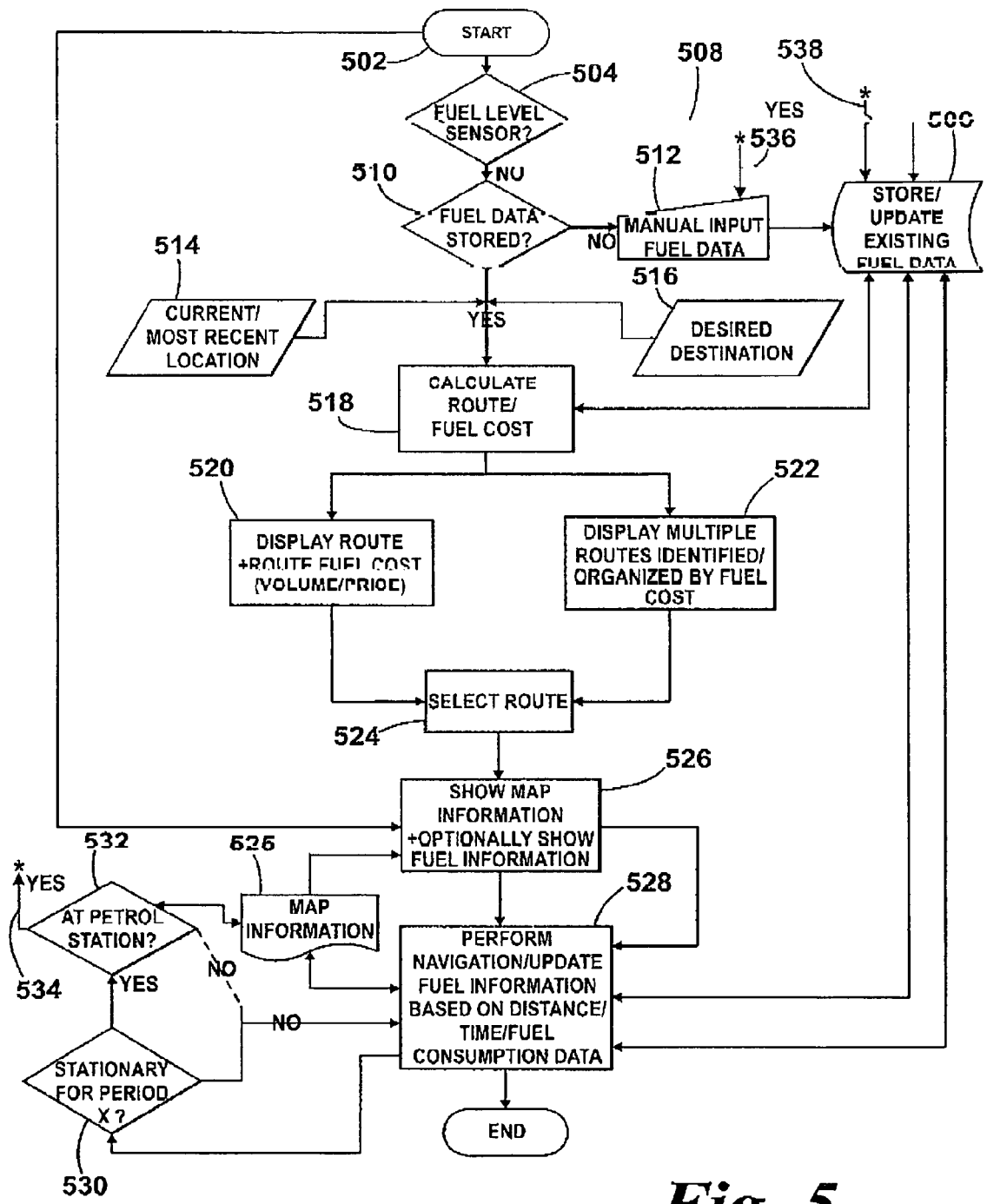
FIG. 5 shows a flowchart of one embodiment of the present invention, including optional routines
Figure 5:
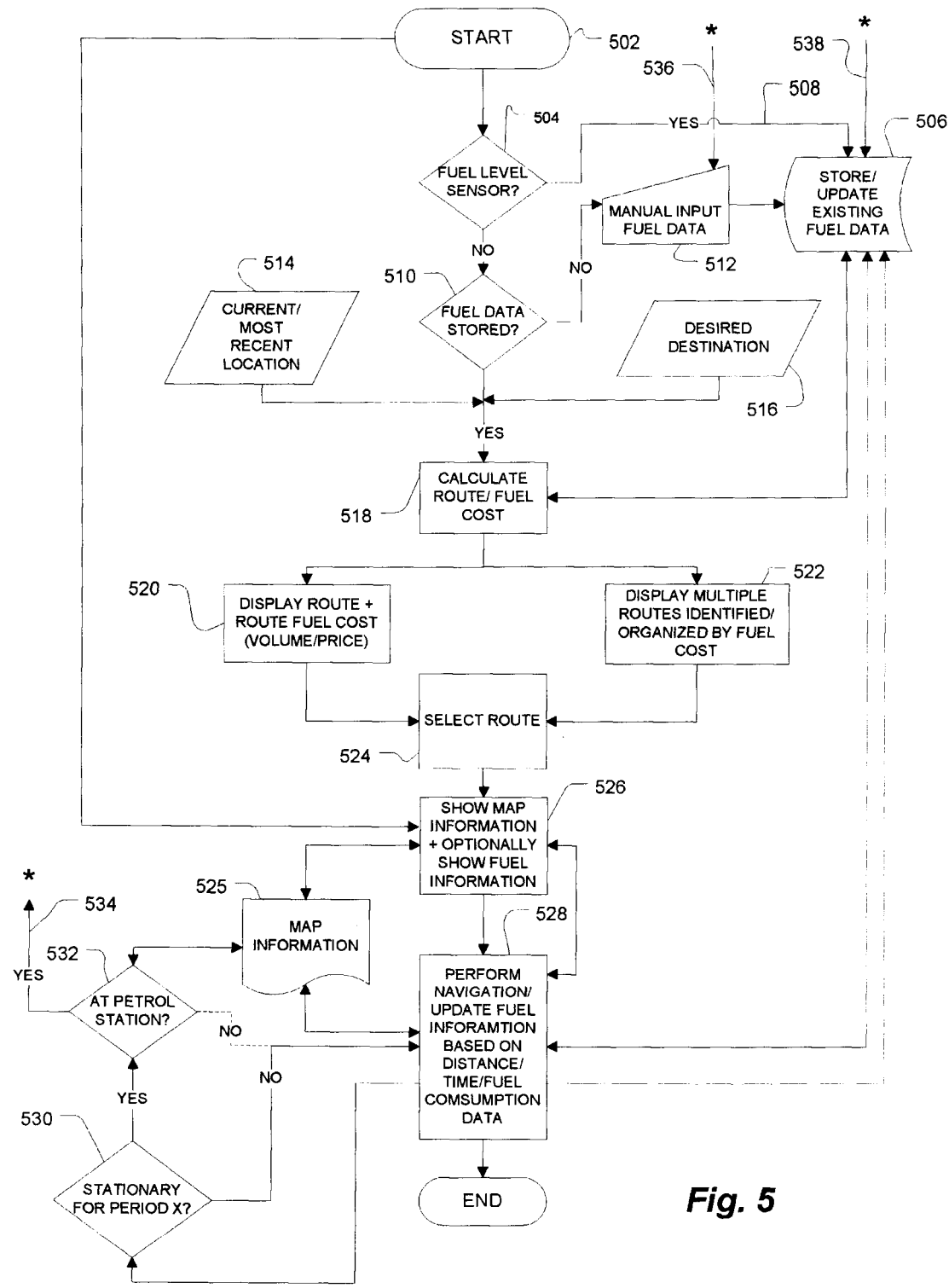

Referring to FIG. 5 there is shown a flowchart 500 demonstrating the various routines which may be performed by a navigation device of the present invention. In one embodiment, the device may be switched on at 502, and in additional to other checking routines (not shown) which may be performed immediately after start-up, a check 504 is made of whether the device is in communication with a fuel level sensor within the vehicle. In this case, an automatic update and/or storage 506 of the fuel level information is made via branch 508. In the absence of such a sensor, a further check is made as to whether any fuel data is stored at 510, and in the absence of such data, the user may be prompted audibly or visually to enter specific fuel data at 512. Once such information is input by the user, again such data is stored at 506. Examples of fuel information useful in the present invention are remaining vehicle fuel, average fuel consumption, fuel price, and fuel type and preferred fuel provider. Of course, it is to be mentioned that such routines may be optional and alternate routines may be provided to enable a user to enter fuel-related information, but in any event, the invention requires that at least some basic fuel information be available to the device.

In conjunction with the more conventional operation of PNDs, a calculation is made of the current device location at 514 if possible, or the last known location is retrieved, and if the device is to perform a navigation function, the user may be prompted for a desired destination at 516. On receipt of the various requisite parameters, including one or more instances of fuel-related data, the device makes a calculation of the proposed navigation route at 518, and this calculation will additionally include some additional calculation incorporating some or all of the fuel-related data so as to provide either (or possibly both) of 1. a display of the calculated route including an indication of the display of the relative fuel cost in litres or monetary value, optionally in a currency localized to the current locality of the device (520), or
2. a display of a plurality of possible routes, in list format or otherwise distinguished, each of the distinguished routes indicating, or being distinguished on the basis of, a relative fuel cost (522).

For example, route calculation may include an additional determination of the amount of fuel likely to be used on a particular route depending on its length, prospective traffic levels and congestion based on historic or dynamic live, for example wirelessly received, traffic information, and the nature of the roads along which the navigation is to take place, for example motorways, highways, trunk and arterial roads, main roads, and minor roads. A user of the device is then prompted to select the or a route at 524, whereupon the display of the device changes to show map information 525 in process 526.

Thus, by maintaining some fuel-related data in memory within the device, it is possible for the device to show how many liters the user is going to spend on a trip (before or during driving), put a "price" on a trip (before, but also after a trip based on actual time/distance) by calculating a formula dependent on price per hour, price per liter and price per kilometer, optionally adjusted to take account of congestion or good or poor roads, and—plan the most fuel-efficient route, instead of the more conventional fastest or quickest routes which are commonly calculated, displayed and selected.

These facilities may be provided by the invention either with or without specific information as regards the remaining fuel volume of a vehicle's petrol tank, but a knowledge of average petrol consumption is required, whether manually or statically provided by the user or dynamically calculated by the device during travel in the event that data is stored regarding a known fuel volume at a particular, earlier time before any navigation or travel (without navigation, but with the device switched on and monitoring such travel) is commenced.

In a particularly preferred embodiment, the device is in communication with one or more alternate sensors or is otherwise capable of maintaining and/or updating information regarding the average fuel and/or power use of the vehicle. Driving behaviour can additionally be monitored if required, and any calculation of fuel cost of a particular route can be accordingly adjusted thereby.

For example, once the user has selected a route and navigation is commenced along that route as indicated at 528, the device may make a periodic check at 530 of whether the device is stationary for a predetermined period of time, and if so, a further check is made of the location of the device at 532 in the map information 525 to establish whether the current location of the device substantially coincides with a known fuel station point of interest (POI) within the map information. If this is determined positively, then branch 534 leads to either or both of a prompting for manual data input at 536 and process 512, and an update of stored fuel information at 538 and process 506. Of course, it is envisaged that the device may receive fuel information dynamically and wirelessly, such information including for example the location of fuel stations, the particular types of fuel available at those stations, the costs of those fuels, and the fuel manufacturer by which those stations are operated.

In additional with other static information such as one or more of
- the volume of the vehicle fuel tank,
- the cost of fuel purchased at the particular station coinciding with the device location,
- the volume of fuel purchased, the device can make a calculation of the average fuel consumption as a particular route is traveled, such information being updated periodically and used in subsequent calculations involving fuel-related information. By such means, rolling average fuel information can be maintained in the device for later use.

The retention of fuel-related information allows for further enhancements. For example, given a remaining fuel volume, and of average fuel consumption, a navigation device can
(a) warn a user (even before he starts driving) that there is not enough fuel to finish the intended and calculated route,
(b) offer to plan a trip via one or more fuel stations possibly restricted by user preferences for example to a certain brand, or to stations offering a certain price
(c) warn a user (while driving) that a certain upcoming petrol station offers his last chance to get petrol (or his last chance to get petrol without detouring) before he reaches the destination to which navigation is currently being performed by the device.

Such features are to be considered as further aspects of the present invention.

The invention claimed is:

1. A personal navigation device comprising:
    a processor to perform, by software installed on the personal navigation device, route calculation and subsequent navigation functions;
    a graphical display;
    a memory;
    map data stored in said memory;
    a user-input device; and
    a signal receiver to receive one or more wireless signals so that the processor can determine a present location of the personal navigation device in conjunction with a user input desired destination information,
    wherein said memory includes one or more fuel-related parameters, said route calculation function utilizes said one or more fuel related parameters to return fuel information representative of a fuel cost of a particular calculated route, repeating said route calculation function during navigation along the calculated route to return an updated fuel information representative of an updated fuel cost for a remaining portion of the calculated route, and subsequent to the selection of the calculated route, the graphical display displays map information and the fuel information together, and the map information and the updated fuel information together during the navigation along the calculated route.

2. The personal navigation device according to claim 1, wherein said one or more fuel-related parameters are input via the user-input device by a user of the personal navigation device.

3. The personal navigation device according to claim 1, wherein said one or more fuel-related parameters is one of actual fuel volume, actual fuel cost, average vehicle urban fuel consumption, and average vehicle extra-urban fuel consumption.

4. The personal navigation device according to claim 2, wherein said one or more fuel-related parameters in said memory of said personal navigation device are derived from the one or more fuel-related parameters input by the user.

5. The personal navigation device according to claim 2, further comprising:
    a processor to update said one or more fuel-related parameters stored in memory by performing one or more averaging functions on said fuel related parameters with each additional entry said one or more fuel-related parameters input by the user.

6. The personal navigation device according to claim 2, wherein said personal navigation device prompts said user for fuel-related data entry at a time when said personal navigation device has been stationery for a time period at a location, the location being identified in said map data as substantially coinciding with a fuel station point of interest identified within on map data.

7. The personal navigation device according to claim 1, wherein the personal navigation device further comprises:
    a receiver to receive wirelessly transmitted data including information regarding current fuel prices in one or more countries and of one or more fuel providers.

* * * * *

UNITED STATES PATENT AND TRADEMARK OFFICE
CERTIFICATE OF CORRECTION

| | | |
|---|---|---|
| PATENT NO. | : 8,135,538 B2 | Page 1 of 2 |
| APPLICATION NO. | : 11/907248 | |
| DATED | : March 13, 2012 | |
| INVENTOR(S) | : Geelen et al. | |

It is certified that error appears in the above-identified patent and that said Letters Patent is hereby corrected as shown below:

In the drawings, delete drawing sheet 6, and replace with new drawing sheet 6. (attached)

Signed and Sealed this
Fifth Day of February, 2013

Teresa Stanek Rea
*Acting Director of the United States Patent and Trademark Office*